Sept. 18, 1956     H. W. CORBITT ET AL     2,763,348
BRAKE FOR MOTOR-OPERATED AIRPLANE LANDING GEAR
Filed April 30, 1954                 2 Sheets-Sheet 1
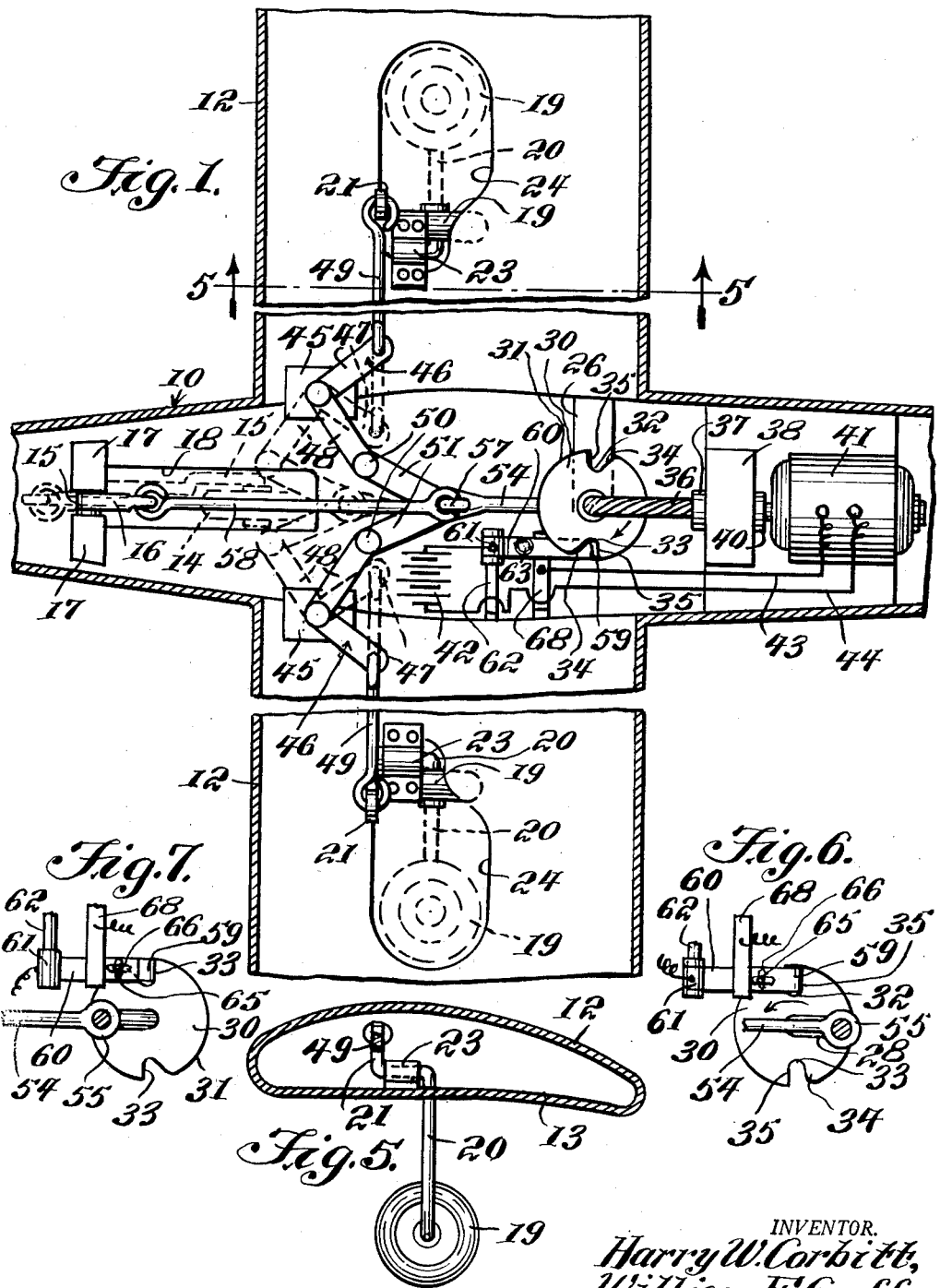
INVENTOR.
Harry W. Corbitt,
William F. Goff,
BY McMorrow, Berman & Davidson
ATTORNEYS

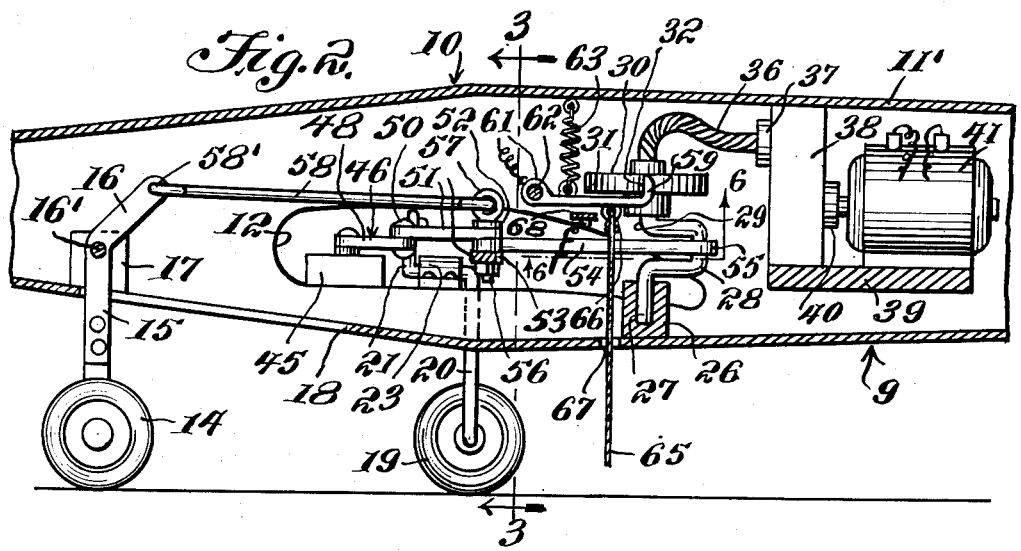

United States Patent Office 2,763,348
Patented Sept. 18, 1956

2,763,348

BRAKE FOR MOTOR-OPERATED AIRPLANE LANDING GEAR

Harry W. Corbitt, Cleveland, and William F. Goff, Alliance, Ohio

Application April 30, 1954, Serial No. 426,772

2 Claims. (Cl. 192—2)

This invention relates to improvements in landing gear for aircraft, and more particularly, but not exclusively, to improved landing gear for model or miniature airplanes which is operable from the ground while an airplane is in flight.

An important object of the invention is to provide simple, efficient, and reliable landing gear of the character indicated above whereby an operator of an airplane can easily and quickly repeatedly raise or lower the landing mechanism of an airplane as conditions of flight dictate, by manipulation of a control cord.

Another important object of the invention is the provision in landing gear of the character indicated above of power operating means therefor, and more especially electric motor operated means, whereby raising and lowering of the landing mechanism is produced by the power operated means, through pull exerted on the control cord, but otherwise independently of manipulation of the cord by an operator.

Other important objects and advantageous features of the invention will be apparent from the following description and the accompanying drawing, wherein, for purposes of illustration only, a specific form of the invention is set forth in detail.

In the drawings:

Figure 1 is a fragmentary and contracted horizontal section taken through an airplane, showing power driven landing gear operating means in accordance with the invention, the landing gear being in raised position;

Figure 2 is a fragmentary vertical longitudinal section taken through an airplane, showing the landing gear operating mechanism in side elevation with the landing gear in lowered position;

Figure 3 is a fragmentary and contracted transverse vertical section taken on the line 3—3 of Figure 2;

Figure 4 is a fragmentary view similar to Figure 2, showing the landing gear in raised position;

Figure 5 is a transverse vertical section taken on the line 5—5 of Figure 1;

Figure 6 is a fragmentary horizontal section taken on the line 6—6 of Figure 2 showing the parts of the landing gear in down and locked position; and Figure 7 is a similar section taken on the line 7—7 of Figure 4, showing the parts of the landing gear in up and locked position.

Referring in detail to the drawings, wherein like numerals designate like parts throughout the several views, the numeral 9 generally designates a model or miniature airplane having a hollow longitudinal fuselage 10, including a bottom wall 11, and hollow wings 12, 12 projecting laterally from the fuselage 10 and opening thereinto at their inner or inboard ends. The wings 12, 12 have bottom walls 13, 13.

In the present illustration, a tricycle landing gear is shown. However, a two-wheel landing gear is also contemplated, and in this case the front landing gear wheel is omitted, together with its connection to the operating means.

As herein shown, there is provided a front landing wheel 14 journalled on the lower end of a strut 15 which terminates at its upper end in a rearwardly and upwardly inclined lever 16. The strut 15 is pivoted at 16' at the juncture of the strut 15 and the lever 16 on a block 17 which is fixed on the fuselage bottom wall 11 at the forward end of a longitudinally elongated slot 18 provided in the bottom wall 11 for receiving the strut 15 and wheel 14 in their raised position, as shown in Figure 4.

The landing gear further comprises similar wing mounted landing wheels 19, 19 which are laterally displaced from the front landing wheel 15, and are carried by transversely or laterally swingable struts 20, 20 which terminate at their upper ends in oppositely and laterally outwardly inclined levers 21, 21, which are pivoted at their junctures with the struts 20, 20 as indicated at 22, 22 on blocks 23, 23 fixed on the bottom walls 13, 13 of the wings, at the laterally inward ends of laterally or transversely elongated slots 24, 24 provided in the wing bottom walls for receiving the struts 20 and wheels 19, as particularly well shown in Figure 3, in dotted lines.

A base or block 26 is fixed centrally on the fuselage bottom wall 11 rearwardly of the longitudinal center of the wings 12, 12 and in the top of the base 26 is journalled the lower pintle 27 of a crank-throw 28 having an upwardly projecting pintle 29 on which is fixed a concentric landing gear locking rotor or disc 30, having a peripheral edge 31 in which are provided two diametrically opposed notches 32 and 33, respectively. The direction of rotation of the locking rotor is, in the present instance, clockwise, as indicated by the arrow in Figure 1. For this direction of the rotation, the notches 32 and 33 have curved cam leading edges 34 and radial trailing stop edges 35.

A flexible power transmitting shaft 36 has a forward end fixed centrally to the rotor 30 and has a rear end operatively connected to a component 37 of a reducing gear assembly 38 which is fixed on a bracket 39 fixed to the sides of the fuselage 10 behind the rotor 30. On the bracket behind the reducing gear assembly 38 and operatively connected to another component 40 of the assembly 38 is an electric miniature motor 41. A suitable source of current 42, shown diagrammatically, is carried by or connected to the airplane and is electrically connected by wires 43 and 44 to the motor 41.

Blocks 45, 45 are fixed on the bottom walls 13, 13 of the wings 12, 12 forwardly of their center lines and at the junctions of the wings with the fuselage 10, as shown in Figure 1, on which are pivoted on vertical axes and intermediate their ends the similar bell cranks 46, 46. The bell cranks 46, 46 involve divergent outer and inner arms 47 and 48, respectively. The outer arms 47 are pivotally and operatively connected to the wing landing gear strut levers 21, 21 by means of links or connecting rods 49, 49.

The inner arms 48, 48 of the bell cranks 46, 46 are vertically pivoted at 50, 50 to the forward ends of rearwardly converging links 51, 51 whose rearward ends are vertically pivoted on the same axis, as indicated at 52, 53, to the forward end of a pitman or connecting rod 54, whose rearward end is pivoted on the crank-throw 28, as indicated at 55.

A bolt or pivot 56 which effects the connections of the links 51, 51 to the forward end of the connecting rod 54 has an eye 57 on its upper end to which is pivoted the rearward end of a longitudinal connecting rod 58 whose forward end is pivoted to the upper end of the front landing wheel strut lever 16, as indicated at 58'.

The parts above described are so proportioned and positioned that with the rotor notches 32, 33 aligned across the fuselage 10 as shown in Figure 1, the landing gear will be in either locked down or locked up position. In other words, a half revolution of the rotor 30 from the position thereof shown in Figure 1 will effect either raising or lowering of the landing gear, depending upon the starting position of the rotor 30.

The landing gear is locked in either raised or lowered position by the engagement with the radial stop edge 35 of one of the notches, of an upright locking lug 59 on the rearward end of longitudinally extending switch contactor arm or lever 60, which is arranged tangentially along one side of the rotor 30 and beneath the rotor 30 as shown in Figures 1, 2 and 4.

The switch contactor lever 60 occupies a generally horizontal position and is pivoted at its forward end on a transverse horizontal axis, as indicated at 61, on a support 62 fixed on the adjacent side of the fuselage 10. A spring 63 is stretched between the top wall 11' of the fuselage 10 and an intermediate part of the lever 60 whereby the locking lug 59 is urged upwardly and inwardly into engagement with the peripheral edge 31 of the rotor 30 and for engagement in the notches 32 and 33. A control cord 65 is connected at 66 to a rearward part of the contactor lever 60 and depends through a hole 67 provided in the fuselage bottom wall 11 for manipulation by an operator on the ground during flight of the airplane 9, for raising and lowering the landing gear before flight, as for a ground take-off of the airplane.

Pulling downwardly on the control cord 65 pulls the switch contactor lever 60 downwardly against the resistance of the spring 63, moves the locking lug downwardly out of engagement in one of the notches 32, 33, thereby freeing the rotor 30 to turn and change the position of the landing gear, and finally produces electrical engagement of the contactor lever 60 with insulated contact bar 68 which projects from a side of the fuselage 10 beneath the contactor lever 60. The wires 43, and 44, leading from the motor 41 are severally connected to the contact bar 68 and one side of the current source 42, and the other side of the current source 42 is connected to the contactor lever 60, so that upon engagement of the contactor lever 60 with the contact bar 68 the motor 41 will be started and will turn the rotor 30 as long as this contact is maintained. Upon release of the control cord 65 by the operator, the spring 63 will draw the contactor lever locking lug 59 upwardly into engagement with the underside of the rotor 30, whence the locking lug will go into locking engagement with the stop edge 35 of one of the notches 32, 33 which happens to be then moving into the region of the locking lug 59, thereby stopping the rotor 30 in a landing gear locking position and arresting also any residual momentum present in the reducing gear assembly 38 and the motor 41. By releasing the control cord 65 at the proper moment, the operator can determine whether the landing gear is locked in a raised or in a lowered position.

What is claimed is:

1. In landing gear operating mechanism, a motor, a rotor operatively connected to the motor, said rotor having diametrically opposed peripheral stops, linkage operatively connected to said rotor and adapted to be operatively connected to landing gear for raising or lowering the landing gear as said rotor is rotated the distance between the stops, a movably mounted element having a locking lug selectively engageable with either of the stops on the rotor so as to prevent rotation of said rotor, control means for moving said element to engage and disengage the locking lug from a stop, and motor energizing means operatively connected with said element for starting the motor as the locking lug is disengaged from a stop and stopping the motor as the locking lug is engaged with the other stop, said motor being an electric motor, a source of electrical energy therefor, and said motor energizing means comprising a contact and said element comprising a contactor arm, said contact and said contactor arm being connected in circuit with said motor and said source of electric energy, said contactor arm being arranged to be disengaged from said contact upon engagement of said locking lug with a stop.

2. In landing gear operating mechanism, a motor, a rotor operatively connected to the motor, said rotor having diametrically opposed peripheral stops, linkage operatively connected to said rotor and adapted to be operatively connected to landing gear for raising or lowering the landing gear as said rotor is rotated the distance between the stops, a movably mounted element having a locking lug selectively engageable with either of the stops on the rotor so as to prevent rotation of said rotor, control means for moving said element to engage and disengage the locking lug from a stop, and motor energizing means operatively connected with said element for starting the motor as the locking lug is disengaged from a stop and stopping the motor as the locking lug is engaged with the other stop, said control means comprising spring means arranged to urge said element toward engagement with said rotor and its stops, and a control cord arranged to be pulled to withdraw said element away from the rotor and its stops, said motor being an electric motor, a source of electrical energy therefor, and said motor energizing means comprising a contact and said element comprising a contactor arm, said contact and said contactor arm being connected in circuit with said motor and said source of electric energy, said contactor arm being arranged to be disengaged from said contact upon engagement of said locking lug with a stop.

References Cited in the file of this patent
UNITED STATES PATENTS

| | | |
|---|---|---|
| 2,299,082 | Elliott | Oct. 20, 1942 |
| 2,645,882 | Cook | July 21, 1953 |